US008189906B2

(12) United States Patent
Fujimori et al.

(10) Patent No.: US 8,189,906 B2
(45) Date of Patent: May 29, 2012

(54) INFORMATION PROCESSING APPARATUS AND METHOD

(75) Inventors: Tomotaka Fujimori, Yokohama (JP);
Masakazu Matsugu, Yokohama (JP);
Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/731,032

(22) Filed: Mar. 24, 2010

(65) Prior Publication Data

US 2010/0239154 A1 Sep. 23, 2010

Related U.S. Application Data

(63) Continuation of application No. PCT/JP2009/066079, filed on Sep. 15, 2009.

(30) Foreign Application Priority Data

Sep. 24, 2008 (JP) ................... 2008-244194

(51) Int. Cl.
G06K 9/46 (2006.01)
(52) U.S. Cl. ......... 382/159; 382/224; 382/141; 382/190
(58) Field of Classification Search .............. 382/141, 382/190, 224, 259
See application file for complete search history.

(56) References Cited

U.S. PATENT DOCUMENTS

| 6,421,463 | B1 * | 7/2002 | Poggio et al. | 382/224 |
|---|---|---|---|---|
| 6,983,065 | B1 * | 1/2006 | Akgul et al. | 382/141 |
| 7,369,686 | B2 * | 5/2008 | Yokono et al. | 382/118 |
| 2005/0185835 | A1 * | 8/2005 | Matsugu et al. | 382/159 |
| 2008/0137917 | A1 | 6/2008 | Okubo et al. | |
| 2009/0116734 | A1 * | 5/2009 | Willis | 382/159 |

FOREIGN PATENT DOCUMENTS

| CN | 101196992 A | 6/2008 |
|---|---|---|
| EP | 1930842 A1 | 6/2008 |
| JP | 2005-115525 A | 4/2005 |
| JP | 2008-165731 A | 7/2008 |
| KR | 10-2008-0053191 A | 6/2008 |

OTHER PUBLICATIONS

Ishi, Kenichiro, Naonori Ueda, Eisaku Maeda, and You Murase. "Easy-to-understand Pattern Recognition," Ohmsha, Tokyo, pp. 74-79 (1998).
Bo, Trond H., and Inge Jonassen. "New Feature Subset Selection Procedures for Classification of Expression Profiles," Genome Biology vol. 3 No. 4 (2002).

* cited by examiner

Primary Examiner — Stephen R Koziol
(74) Attorney, Agent, or Firm — Canon U.S.A., Inc. IP Division

(57) ABSTRACT

An information processing apparatus for selecting, from a plurality of feature amounts that are extracted from input data items, feature amounts that are to be used to classify the input data items is provided. The information processing apparatus includes generating means for generating a plurality of combinations by generating combinations of feature amounts that are selected from the plurality of feature amounts; first calculating means for calculating, for each of the plurality of combinations, a first evaluation value for evaluating a suitability for classification of the input data items; and second calculating means for obtaining, on the basis of the first evaluation values, for each of the plurality of feature amounts, a second evaluation value for evaluating a suitability for classification of the input data items.

11 Claims, 14 Drawing Sheets

INFORMATION PROCESSING APPARATUS AND METHOD

This application is a Continuation of International Application No. PCT/JP2009/066079, filed Sep. 15, 2009, which claims the benefit of Japanese Patent Application No. 2008-244194, filed Sep. 24, 2008, both of which are hereby incorporated by reference herein in their entirety.

TECHNICAL FIELD

The present invention relates to an information processing apparatus for selecting, from a plurality of feature amounts that are extracted from input data items, feature amounts that are to be used to classify the input data items, and relates to an information processing method and so forth.

BACKGROUND ART

For an information processing apparatus for appearance inspection or the like, there is a scheme in which a group of various feature amounts, such as the mean and variance of pixel values, is extracted from picked-up images of inspection target objects, and in which determination of whether the inspection target objects are non-defective or defective (classification into two classes, non-defective products and defective products) is performed. However, when all of a large number of feature amounts are used, the dimension of feature becomes higher-order. A problem (such as the curse of dimensionality) that occurs in a particular dimension or an increase in processing time that is caused by extraction of redundant feature amounts occurs.

Accordingly, emphasis is being laid on a scheme in which, by selecting appropriate feature amounts, a problem that occurs in a particular dimension is prevented from easily occurring, and in which the speed of arithmetic processing is increased.

Hereinafter, a scheme disclosed in Non Patent Document 1 will be described. In Non Patent Document 1, a scheme is disclosed, in which an evaluation value for evaluating a degree of separation is determined for each of feature amounts, and in which the feature amounts are selected on the basis of the evaluation values in the order from more favorable ones. Specifically, the scheme is a feature selection scheme in which selection criteria are determined using Bayes-error-probability estimation values or ratios of within-class variances to between-class variances.

A Bayes-error-probability estimation value will be described in detail. For example, in a case of a two-class issue, when two classes are denoted by $w_1$ and $w_2$ and features that are observed are denoted by $xO=[x_1, x_2, \ldots, x_k, \ldots, x_N]$, probabilities that $x_k$ belongs to $w_1$ and $w_2$ are denoted by $P(w_1|x_k)$ and $P(w_2|x_k)$, respectively. In this case, a Bayes-error-probability estimation value is represented by the following equation.

[Expression 1]

$$\text{Bayes} = \int \min\{P(w_1|x_k), P(w_2|x_k)\} dx_k \quad \text{(Equation 1)}$$

The Bayes-error-probability estimation value is determined for each of the feature amounts. A lower Bayes-error-probability estimation value indicates that it is better to be used to separate the two classes from each other. Accordingly, the feature amounts can be selected in ascending order of the Bayes-error-probability estimation values.

Next, a ratio of a within-class variance to a between-class variance will be described in detail. For example, in a case of a two-class issue, when two classes are denoted by $w_1$ and $w_2$ and features that are observed are denoted by $xO=[x_1, x_2, \ldots, x_k, \ldots, x_N]$, a ratio of a within-class variance to a between-class variance associated with the feature amount $x_k$ is determined. Additionally, a set of patterns belonging to the class $w_1$ is denoted by $A_i$. The number of patterns included in $A_i$ is denoted by $n_i$. The mean of $x_k$ of the patterns belonging to the class $w_1$ is denoted by $m_i$. Furthermore, the number of all patterns is denoted by n, and the mean of $x_k$ of all of the patterns is denoted by m. In this case, a within-class variance ($\sigma^2_W$) and a between-class variance ($\sigma^2_B$)     [Expression 2]

are represented by the following equations.

[Expression 3]

$$\sigma^2_W = \frac{1}{n} \sum_{i=1,2} \sum_{xk \in A_i} (x_k - m_i)^2 \quad \text{(Equation 2)}$$

[Expression 4]

$$\sigma^2_B = \frac{1}{n} \sum_{i=1,2} n_i (m_i - m)^2 \quad \text{(Equation 3)}$$

A ratio of the within-class variance to the between-class variance can be represented by the following expression.

$$\sigma_B^2/\sigma_W^2 \quad \text{[Expression 5]}$$

In this manner, the ratios of the within-class variances to the between-class variances are determined, and the feature amounts are selected in descending order of the ratios of the within-class variances to the between-class variances. Furthermore, in Non Patent Document 2, a scheme is disclosed, in which combinations of two feature amounts are generated, in which the combinations of two feature amounts are evaluated in a two-dimensional feature space, and in which the feature amounts are selected in units of two. It is described that, using the scheme in which combinations of two feature amounts are generated, features can be selected with an accuracy that is higher than an accuracy with which the feature amounts are selected on a one-by-one basis.

Documents of Related Art
Non Patent Documents
Non Patent Document 1:
Kenichiro Ishi, Naonori Ueda, Eisaku Maeda, You Murase, "Easy-to-understand pattern recognition", Ohmsha, Tokyo, 1998.
Non Patent Document 2:
Trond Hellem Bo and Inge Jonassen, "New feature subset selection procedures for classification of expression profiles," Genome Biology 2002, volume 3 (vol. 3), no. 4: research.

DISCLOSURE OF INVENTION

Problems to be Solved by the Invention

However, in the scheme disclosed in Non Patent Document 1, features are selected on a one-by-one basis using the above-described Bayes-error-probability estimation values or one-dimensional ratios of within-class variances to between-class variances, and the feature amounts are not evaluated in consideration of compatibility among the feature amounts within combinations. Accordingly, as a result, the scheme has an issue that a problem which occurs in a particular dimension is caused to easily occur, and that the speed of arithmetic processing is reduced by extracting redundant feature amounts. Similarly, in the scheme disclosed in Non Patent Document 2, the number of feature amounts included in each combination is set in advance, and combinations of feature amounts are selected. The feature amounts are not evaluated in consideration of compatibility among the feature amounts within the combinations.

Means for Solving the Problems

An information processing apparatus according to the present invention is an information processing apparatus for selecting, from a plurality of feature amounts that are extracted from input data items, feature amounts that are to be used to classify the input data items. The information processing apparatus includes generating means for generating a plurality of combinations by generating combinations of feature amounts that are selected from the plurality of feature amounts; first calculating means for calculating, for each of the plurality of combinations, a first evaluation value for evaluating a suitability for classification of the input data items; and second calculating means for obtaining, on the basis of the first evaluation values, for each of the plurality of feature amounts, a second evaluation value for evaluating a suitability for classification of the input data items.

Advantages of Invention

The present invention is made in view of the above-described issues. An object of the present invention is to, with the information processing apparatus for selecting feature amounts that are to be used to classify input data items from a plurality of feature amounts that are extracted from the input data items, select feature amounts suitable for classification of the input data items in consideration of compatibility among the feature amounts within the combinations.

BEST MODES FOR CARRYING OUT THE INVENTION

First Embodiment

Hereinafter, a first embodiment will be described in detail with reference to the drawings.

Figure 1:
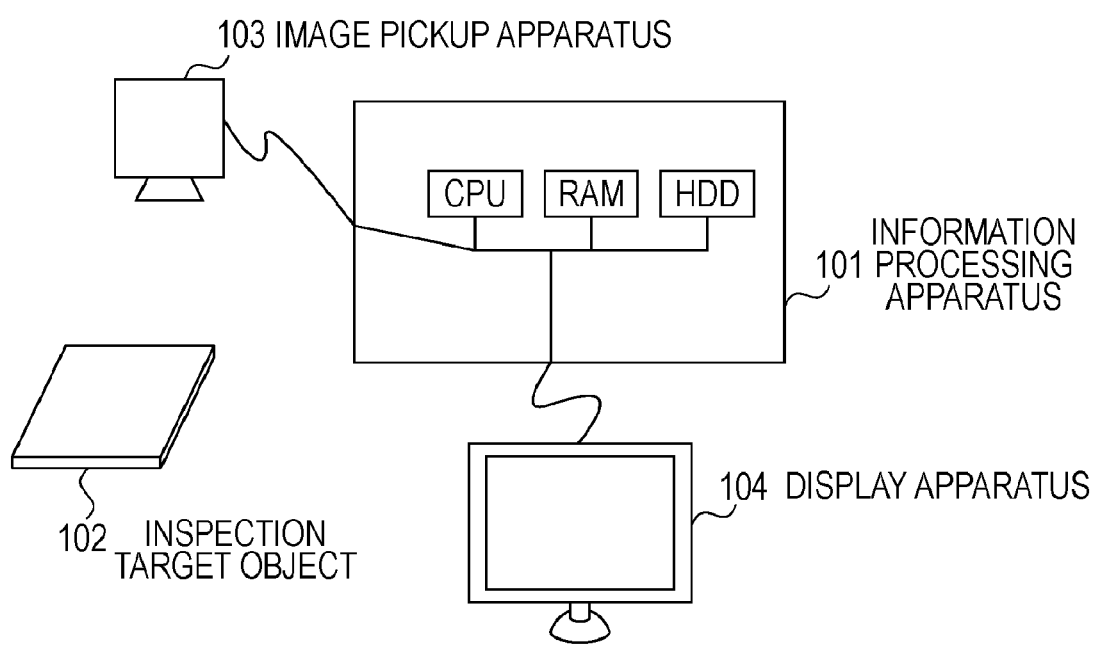
FIG. 1 is a diagram illustrating a configuration of an information processing apparatus according to a first embodiment.

FIG. 1 is a diagram illustrating a configuration of an information processing apparatus according to the first embodiment.

Reference numeral 101 denotes an information processing apparatus that performs information processing for appearance inspection in the present embodiment. The information processing apparatus 101 includes a CPU (central processing unit), an RAM (random-access memory), an HDD (hard disk drive), and so forth. The CPU executes a computer program for appearance inspection. In the HDD and the RAM, the computer program for appearance inspection and data items are stored.

Reference numeral 102 denotes an inspection target object that is an appearance inspection target in the present embodiment. The inspection target object 102 is, for example, a rubber plate utilized in an industrial product. The surfaces of the rubber plates of some inspection target objects 102 have asperities or flows. The asperities or flows are detected by appearance inspection, and the rubber plates are classified into non-defective products and defective products.

Reference numeral 103 denotes an image pickup apparatus for picking up images of the inspection target objects 102 in the present embodiment. The image pickup apparatus 103 is configured using a video camera capable of obtaining a video image (image patterns) of the surfaces of the inspection target objects 102 or the like. The image pickup apparatus 103 transmits the obtained video image to the information processing apparatus 101. The information processing apparatus 101 performs information processing for appearance inspection using the transmitted video image.

Reference numeral 104 denotes a display apparatus for displaying results of appearance inspection. The display apparatus 104 is configured using a monitor or the like. The display apparatus 104 displays results of appearance inspection that have been transmitted from the information processing apparatus 101.

Figure 2:
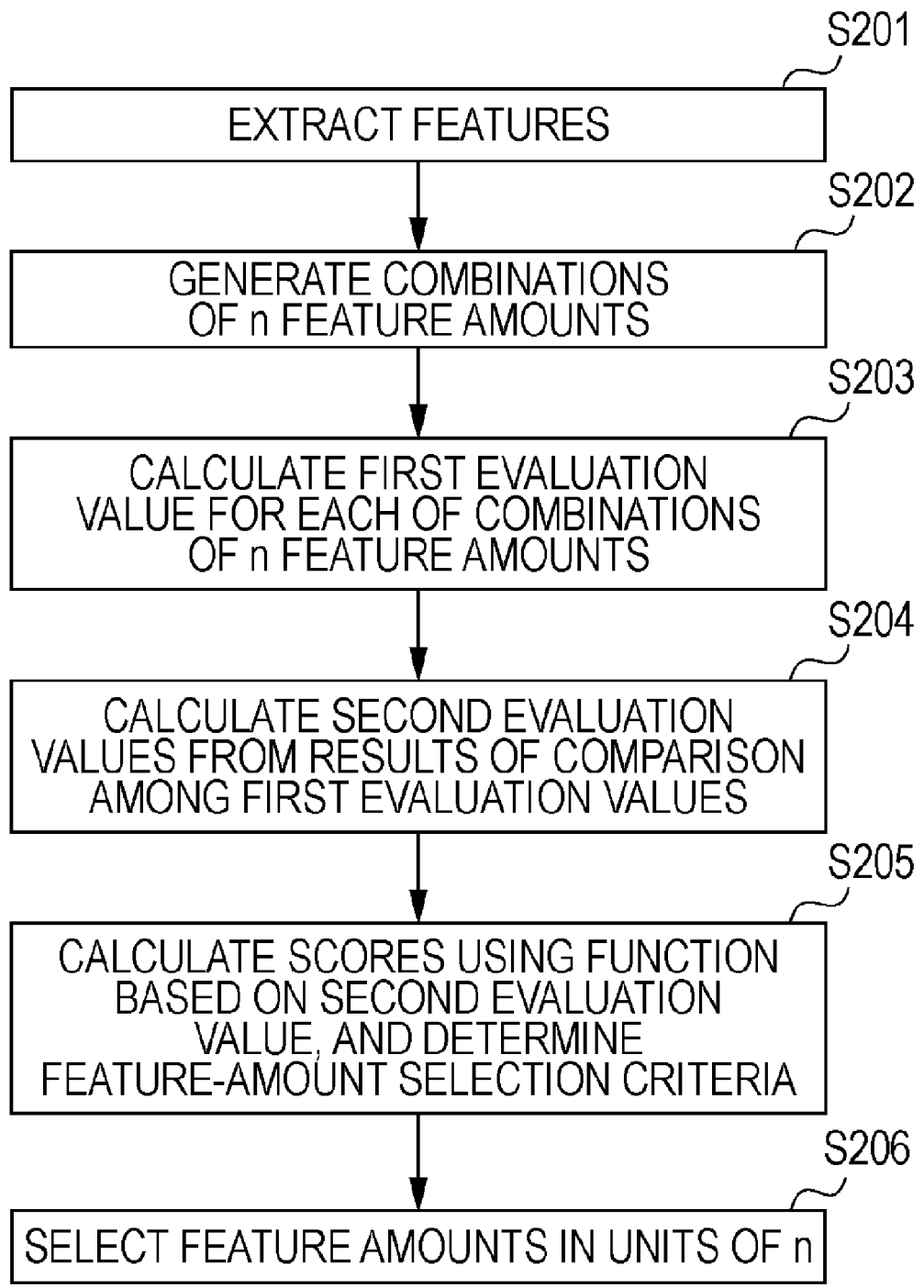
FIG. 2 is a flowchart illustrating information processing that is performed by the information processing apparatus 101 in the first embodiment.

FIG. 2 is a flowchart illustrating information processing that is performed by the information processing apparatus 101 in the present embodiment. In the present embodiment, appearance inspection will be described, in which determination of whether or not parts are non-defective (classification into two classes, non-defective products and defective products) is performed using the picked-up images of the inspection target objects 102.

In appearance inspection in the present embodiment, two classes into which non-defective products and defective products are classified exist. A plurality of hierarchical images are generated from input image patterns. A plurality of feature amounts are extracted from the plurality of generated hierarchical images. Feature amounts that are suitable for appearance inspection are selected from the plurality of extracted feature amounts.

Hereinafter, an overview of a flow illustrated in FIG. 2 will be described. Note that, each process of the flow illustrated in FIG. 2 is performed by the information processing apparatus 101. Furthermore, the details of each process will be described below.

(Step 201) In step 201, a plurality of feature amounts that are to be used for appearance inspection are extracted from input image patterns that are obtained by the image pickup apparatus 103.

(Step 202) In step 202, the information processing apparatus 101 functions as generating means for generating a plurality of combinations. The information processing apparatus 101 generates combinations of n (n≧2) feature amounts using the plurality of feature amounts that have been extracted in step 201.

(Step 203) In step 203, the information processing apparatus 101 functions as first calculating means for calculating first evaluation values for evaluating suitabilities for classification of input image data items. A first evaluation value is calculated for each of the plurality of combinations of n feature amounts that have been set in step 202. The first evaluation value in the present embodiment indicates that the feature amounts are suitable for appearance inspection. In this case, for each of the feature amounts, the combination of feature amounts (the combination of n feature amounts) whose first evaluation value for the feature amount is most favorable is determined.

(Step 204) In step 204, the information processing apparatus 101 functions as second calculating means. The information processing apparatus 101 compares the plurality of first evaluation values with one another, thereby calculating second evaluation values for evaluating suitabilities for classification of the input image data items.

(Step 205) In step 205, scores are calculated using the second evaluation values, and feature selection criteria are determined.

(Step 206) In step 206, further, the feature amount whose score is most favorable and the combination of feature amounts (the combination of n feature amounts) that has been evaluated in step 204 as a combination in which the feature amount is included are selected. Feature selection is repeated using the feature selection criteria for the feature amounts excluding the selected feature amounts.

Hereinafter, the details of each process illustrated in FIG. 2 will be described.

(Details of process in step 201 (extraction of plurality of feature amounts))

The details of a process in step 201 will be described.

Figure 3:
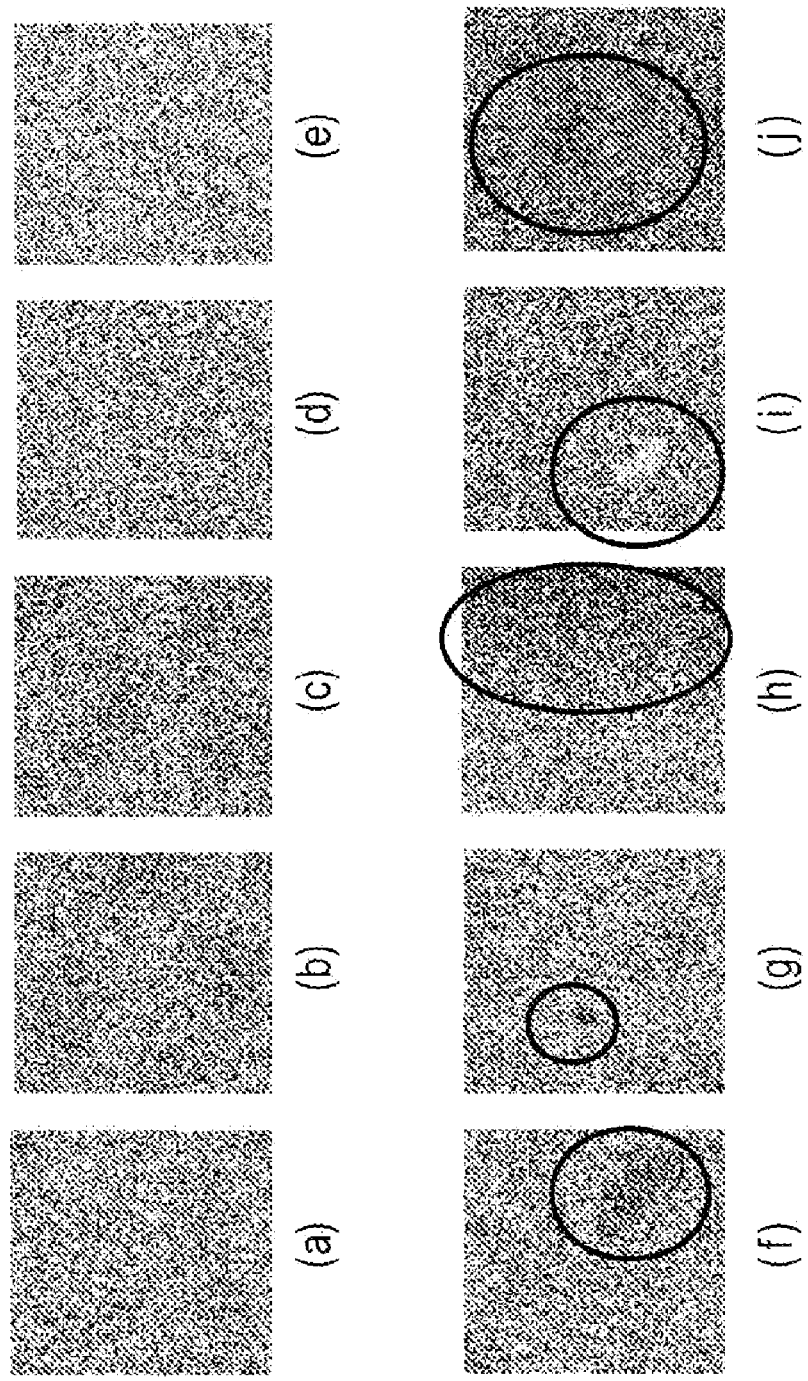
FIG. 3 include diagrams illustrating examples of grayscale images having 128×128 pixels that are picked-up and cut-out images of surfaces of rubber plates subjected to surface roughing.

FIG. 3 include diagrams illustrating examples of gray-scale images having 128×128 pixels that are picked-up and cut-out images of surfaces of rubber plates subjected to surface roughing which are examples of the inspection target objects 102.

Surfaces of normal rubber plates are illustrated in parts (a) to (e) of FIG. 3. Surfaces of abnormal rubber plates are illustrated in parts (f) to (j) of FIG. 3. In this case, image patterns such as image patterns illustrated in parts (a) to (e) are considered as normal patterns. Image patterns such as image patterns illustrated in parts (f) to (j) are considered as abnormal patterns. Next, the types of abnormal patterns are given. Parts (f) and (g) illustrate patterns in which an inconsistency in the form of a black spot exists. Part (h) illustrates a pattern the entirety of which has a gradation. Furthermore, part (i) illustrates a pattern in which an inconsistency in the form of a white spot exists. Part (j) illustrates a pattern one portion of which has a low contrast. In this step, a plurality of feature amounts indicating such features of patterns are calculated.

Figure 4:
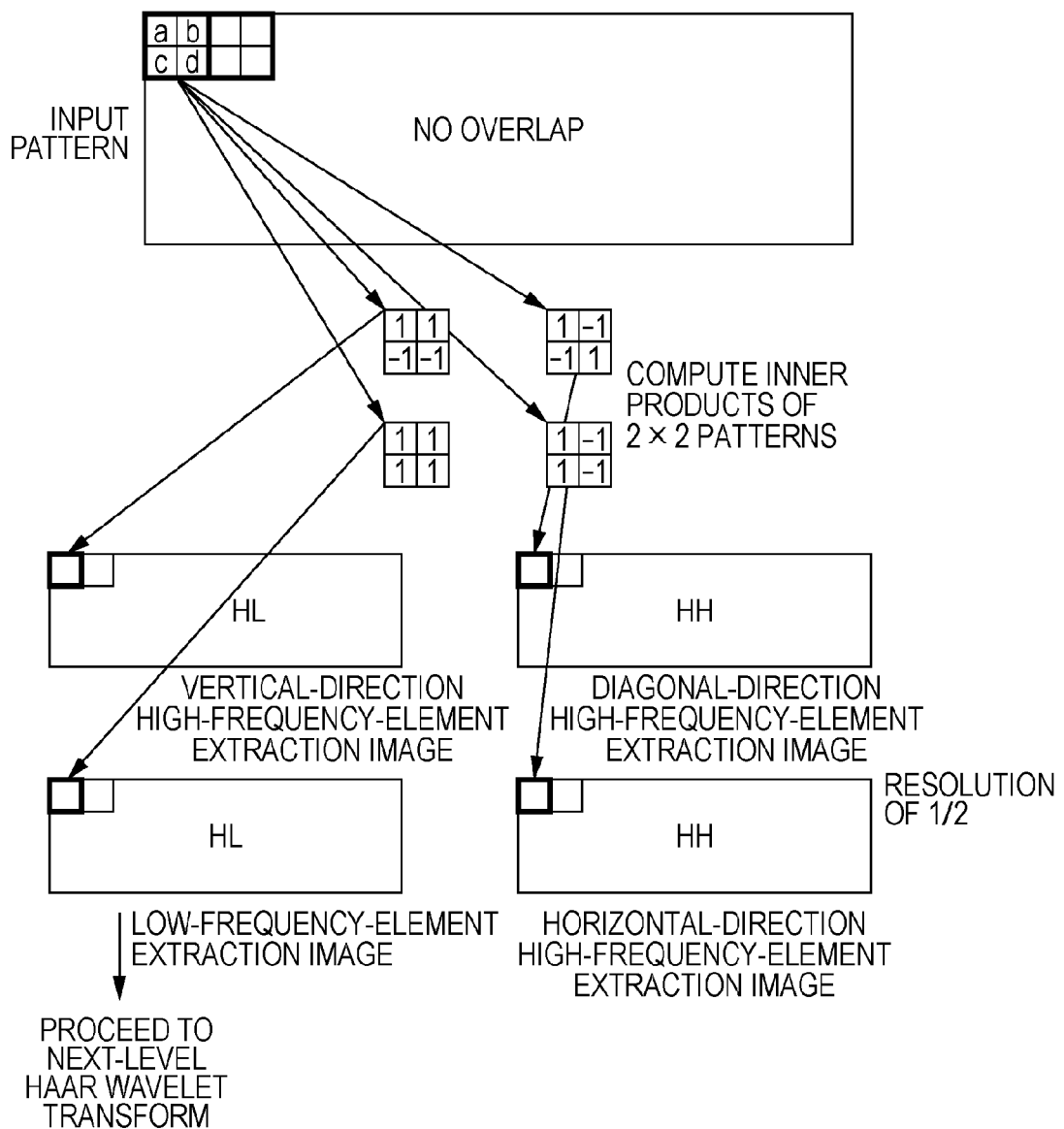
FIG. 4 is a diagram illustrating a specific process of extracting a plurality of feature amounts in a first embodiment.

FIG. 4 is a diagram illustrating a specific process of extracting a plurality of feature amounts in the present embodiment.

In the present embodiment, although pn image patterns are used as the input image patterns, wavelet transformation which is a scheme for transforming a pattern into a pattern in a frequency domain, is used for the image patterns in order to emphasize defects.

Particularly, FIG. 4 illustrates Haar wavelet transformation that is one type of wavelet transformation. First, inner products are computed using four types of filters for an input pattern prior to being transformed. As a result, four types of patterns, a vertical-direction high-frequency-element extraction pattern (HL), a diagonal-direction high-frequency-element extraction pattern (HH), a horizontal-direction high-frequency-element extraction pattern (LH), and a low-frequency-element extraction pattern (LL), are generated. A method for generating a vertical-direction high-frequency-element extraction pattern will be specifically given. As illustrated in FIG. 4, for four pixels of the input pattern, $$\text{an inner product } a + b - c - d \text{ of } \begin{bmatrix} a & b \\ c & d \end{bmatrix} \text{ and } \begin{bmatrix} 1 & 1 \\ -1 & -1 \end{bmatrix} \quad \text{[Expression 6]}$$

is considered as a value of a pixel of a vertical-direction high-frequency-element extraction pattern. Calculation in this manner is performed in units of four pixels for the entire image region without performing the calculation on any pixel that have been subjected to the calculation, thereby generating a vertical-direction high-frequency-element extraction pattern. For a diagonal-direction high-frequency-element extraction pattern, $$\begin{bmatrix} 1 & -1 \\ -1 & 1 \end{bmatrix} \quad \text{[Expression 7]}$$

is used as a filter. For a horizontal-direction high-frequency-element extraction pattern, $$\begin{bmatrix} 1 & -1 \\ 1 & -1 \end{bmatrix} \quad \text{[Expression 8]}$$

is used as a filter. For a low-frequency-element extraction pattern, $$\frac{1}{4}\begin{bmatrix} 1 & 1 \\ 1 & 1 \end{bmatrix} \quad \text{[Expression 9]}$$

is used as a filter.

Consequently, the four types of patterns are generated so that the resolution is halved. Furthermore, the next-level Haar wavelet transformation is performed on the four types of patterns starting with the low-frequency-element extraction pattern, thereby generating the four types of patterns so that the resolution is further halved. In this manner, the frequency of the patterns is transformed into a lower frequency in a hierarchical manner. The pattern prior to being transformed includes 128×128 pixels. Accordingly, a pattern having 64×64 pixels is generated by a first transformation. A pattern having 32×32 pixels is generated by a second transformation. After that, a pattern having 16×16 pixels, a pattern having 8×8 pixels, a pattern having 4×4 pixels, and a pattern having 2×2 pixels are generated. A pattern having 1×1 pixel is generated by the last seventh transformation. In other words, finally, a vertical-direction high-frequency-element extraction pattern having 1×1 pixel, a diagonal-direction high-frequency-element extraction pattern having 1×1 pixel, a horizontal-direction high-frequency-element extraction pattern having 1×1 pixel, and a low-frequency-element extraction pattern having 1×1 pixel are obtained. Accordingly, including the pattern prior to being transformed, 1+4×7=29 types of patterns are obtained.

From each of the individual hierarchical patterns that have been obtained in this manner, six types of macroscopic feature amounts, such as the maximum value, the mean, the variance, the kurtosis, the skewness, and the geometric mean of all pixel values, are extracted. As the macroscopic feature amounts, the mean, the variance, the kurtosis, the skewness, and the geometric mean of pixel values are represented by Equations 5, 6, 7, 8, and 9, respectively. Note that each image has a size of a pixels in a vertical direction and b pixels in a horizontal direction, and a pixel value that is an i-th pixel value in the vertical direction and a j-th pixel value in the horizontal direction of the image is denoted by p (i, j). In a case in which a histogram of p is constructed, for each bin, a number, a value, and a frequency are denoted by k, $X_k$, and $M_k$, respectively.

[Expression 10]

$$\text{mean}(p) = \frac{1}{ab}\sum_{i=1}^{a}\sum_{j=1}^{b} p(i,j) \quad \text{(Equation 5)}$$

[Expression 11]

$$\text{var}(p) = \frac{1}{ab}\sum_{i=1}^{a}\sum_{j=1}^{b} (p(i,j) - \text{mean}(p))^2 \quad \text{(Equation 6)}$$

[Expression 12]

$$Kw(p) = \frac{\sum_{k} M_k(X_k - \text{mean}(p))^4}{n(\text{var}(p)^2)} \quad \text{(Equation 7)}$$

[Expression 13]

$$Sk(p) = \frac{\sum_{k} M_k(X_k - \text{mean}(p))^3}{n(\text{var}(p)^{1.5})} \quad \text{(Equation 8)}$$

[Expression 14]

$$prod(p) = \left(\prod_{i=1}^{a}\prod_{j=1}^{b} p(i,j)\right)^{\frac{1}{ab}} \quad \text{(Equation 9)}$$

The maximum value and the six types of feature amounts that are represented by Equations 5 to 9 are extracted from the input pattern prior to being transformed, which has not been subjected to Haar wavelet transformation, and the 29 types of images, which are individual hierarchical images that have been subjected to Haar wavelet transformation. In other words, the six types of macroscopic feature amounts are extracted from each of the 29 types of images in total. Consequently, 29×6=174 (hereinafter, referred to as "N") feature amounts are extracted for each of the input patterns. Note that N feature amounts are extracted from each of pn patterns that are used as the input patterns.

Here, a scheme using Haar wavelet transformation is described. However, other transformation schemes such as schemes using another wavelet transformation, edge extraction, Fourier transformation, and Gabor transformation may be used. Furthermore, other statistics such as a contrast, a value obtained by subtracting the minimum from the maximum, and a standard deviation may be used as the macroscopic feature amounts. With the above-described process, a plurality of feature amounts can be extracted from the input image patterns.

(Step 202: generation of combinations of n feature amounts)

In step 202, the feature amounts are not selected on a one-by-one basis, and are selected in units of n by generating combinations of n feature amounts. The number n of feature amounts included in each combination may be determined in accordance with a user instruction or the like. Alternatively, the number n of feature amounts included in each combination may be set in advance for each of the inspection target objects 102. When the number of feature amounts that have been extracted from the input image patterns is N, combinations of n feature amounts are generated, thereby generating $_NC_n$ combinations.

(Step 203: calculation of first evaluation value for each of combinations of n feature amounts)

The details of step 203 will be described. In step 203, a first evaluation value is calculated for each of the $_NC_n$ combinations that have been generated in step 202.

The first evaluation value in the present embodiment is an evaluation value for evaluating whether or not the combination of n feature amounts is suitable for determination for classification of the input data items. More specifically, the first evaluation value indicates whether or not the combination of feature amounts is suitable as a combination of feature amounts that is to be used for a case in which determination of whether the inspection target objects 102 are non-defective products or defective products is performed.

In a case of a two-class issue regarding two classes, non-defective products and defective products, in the present embodiment, an n-dimensional Bayes-error-probability estimation value is determined as one example of the first evaluation value. Here, each of the two classes is denoted by a corresponding one of $w_1$ and $w_2$, and a vector having n features is denoted by $X=[x_1, \ldots, x_n]^t$. In this case, a distribution of a probability that x belongs to each of $w_1$ and $w_2$, i.e., an n-dimensional histogram for each of $w_1$ and $w_2$, is generated. Each of the histograms is denoted by a corresponding one of $P(w_1|x)$ and $P(w_2|x)$. Thus, a Bayes-error-probability estimation value is represented by the following equation.

[Expression 15]

$$\text{Bayes} = \int \min\{P(w_1|x), P(w_2|x)\}dx \quad \text{(Equation 10)}$$

Calculation of a probability estimation value in this manner is performed for each of the combinations of n feature amounts. Here, regarding the calculated Bayes-error-probability estimation value, as in the one-dimensional case, it can be considered that the lower the value of a combination is, the more suitable for classification into non-defective products or defective products the combination is.

Note that, although a case of a two-class issue is described in the above description, the Bayes-error-probability estimation value can be applied for multiple classes.

Next, as another example of the first evaluation value, a case will also be described, in which a ratio of a within-class variance to a between-class variance is used instead of the Bayes-error-probability estimation value. For example, in a case of a two-class issue, when two classes are denoted by $w_1$ and $w_2$ and features that are observed are denoted by $X=[x_1, \ldots, x_n]^t$, a ratio of a within-class variance to a between-class variance associated with the feature vector x is determined. Here, a set of patterns belonging to the class $w_1$ is denoted by $A_i$. The number of patterns included in $A_i$ is denoted by $pn_i$. The mean of x of the patterns belonging to the class $w_1$ is denoted by $m_i$. Furthermore, the number of all patterns is denoted by pn, and the mean vector of x of all of the patterns is denoted by m. Accordingly, a within-class variance ($\sigma^2_W$) and a between-class variance ($\sigma^2_B$) [Expression 16]

can be represented by the following equations.

[Expression 17]

$$\sigma_W^2 = \frac{1}{pn} \sum_{i=1,2} \sum_{2x \in A_i} (x - m_i)^t (x - m_i) \quad \text{(Equation 11)}$$

[Expression 18]

$$\sigma_B^2 = \frac{1}{pn} \sum_{i=1,2} pn_i (m_i - m)^t (m_i - m) \quad \text{(Equation 12)}$$

Thus, a ratio of the within-class variance to the between-class variance can be represented by the following expression.

$\sigma_B^2/\sigma_W^2$ [Expression 19]

In this manner, a ratio of a within-class variance to a between-class variance is determined, and considered as the first evaluation value.

Note that, although a case of a two-class issue is described in the above description, the ratio of the within-class variance to the between-class variance can be applied for multiple classes. In the present embodiment, a Bayes-error-probability estimation value or a ratio of a within-class variance to a between-class variance, with which a degree of separation of classes from each other can be evaluated, is used as the first evaluation value. However, any evaluation value with which a suitability for classification can be evaluated may be used.

(Step 204: calculation of second evaluation values from results (determination results) of comparison among first evaluation values)

In step 204, the first evaluation values of the combinations of the plurality of feature amounts are compared with one another, thereby calculating, for each of the plurality of feature amounts, a second evaluation value for evaluating whether or not the feature amount is suitable for classification of the input data items.

Hereinafter, calculation of the second evaluation values will be described in detail.

First, one feature amount is focused on. Among the combinations in which the feature amount is included, the combination whose first evaluation value is most favorable is determined. When the Bayes-error-probability estimation values are used as the first evaluation values, the combination of feature amounts whose Bayes-error-probability estimation value is lowest is determined.

Then, a predetermined value is added to a second evaluation value of each of the feature amounts included in the combination whose first evaluation value is most favorable. Then, the other feature amounts are sequentially focused on, and the predetermined value is added to a second evaluation value of each of the feature amounts. In this manner, all of the feature amounts are focused on, and the second evaluation value, to which the predetermined value has been added, is calculated as a sum for each of the feature amounts.

Figure 5:
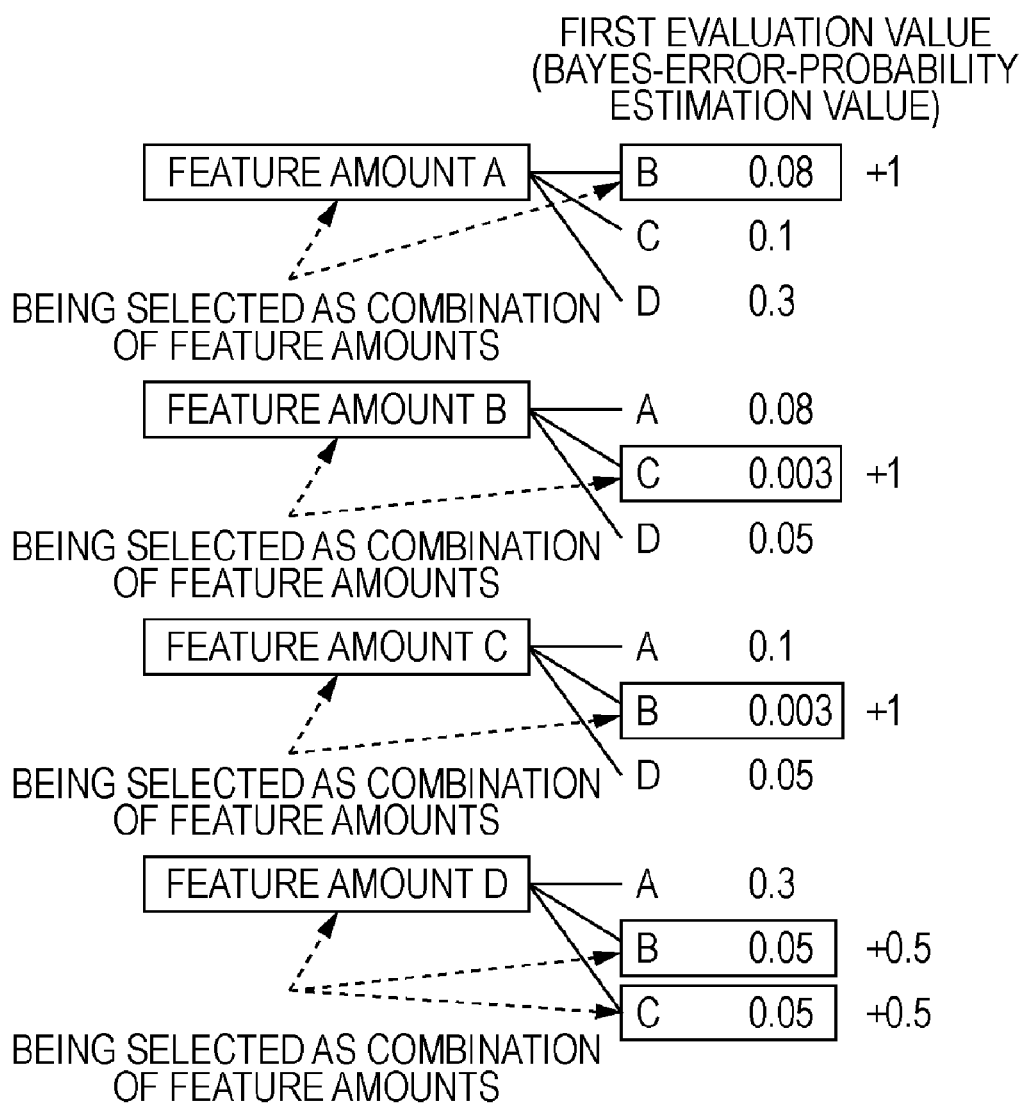
FIG. 5 is a diagram illustrating a concept of calculating second evaluation values in a case of n=2.

FIG. 5 is a diagram illustrating a concept of calculating the second evaluation values in a case of n=2.

Figure 6:
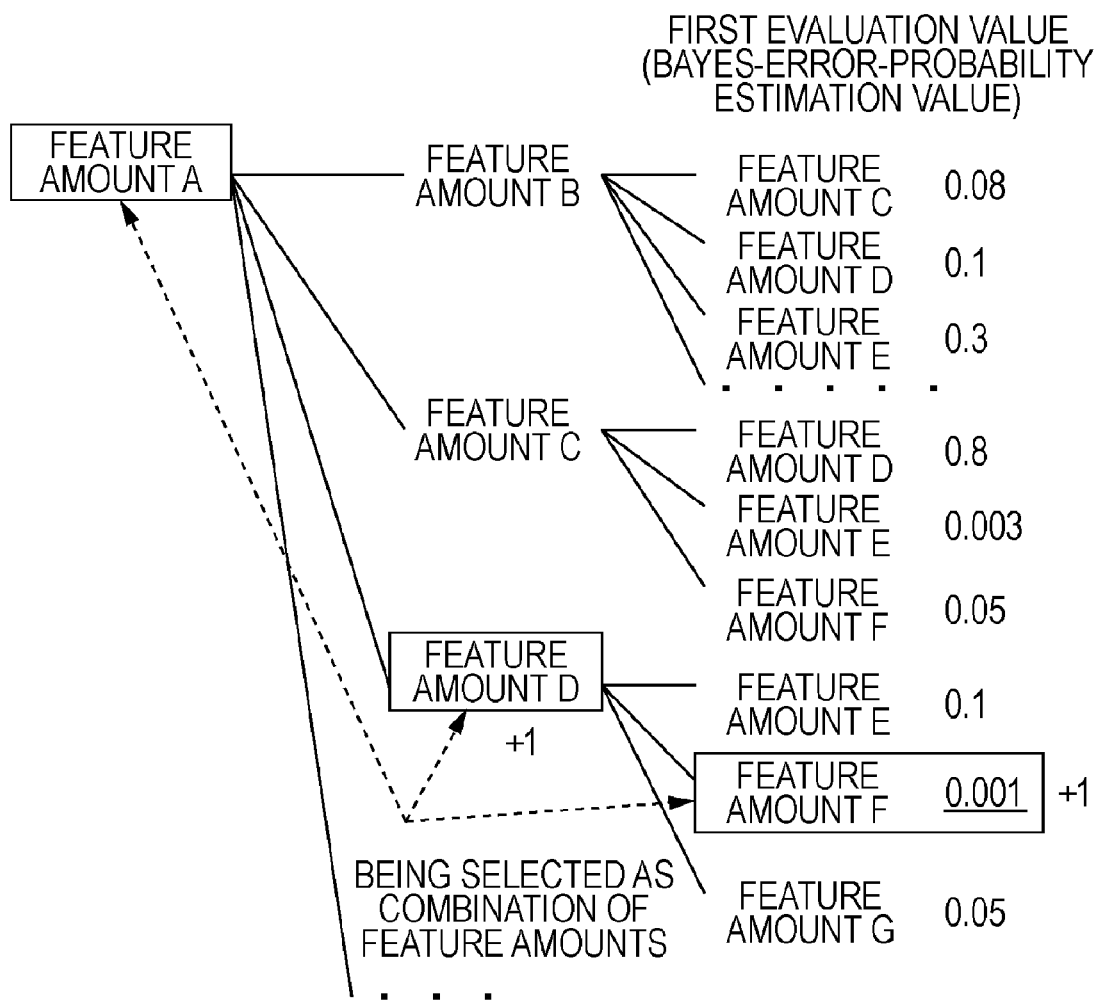
FIG. 6 is a diagram illustrating a concept of calculating the second evaluation values in a case of n=3.

FIG. 6 is a diagram illustrating a concept of calculating the second evaluation values in a case of n=3.

First, the concept of calculating the second evaluation values in a case of n=2 will be described with reference to FIG. 5. In FIG. 5, a case in which there are four types of feature amounts, feature amounts A, B, C, and D, is described as an example.

First, when the feature amount A is focused on, among combinations of the feature amount A and one of the other feature amounts, i.e., among a combination of the feature amounts A and B, a combination of the feature amounts A and C, and a combination of the feature amounts A and D, a feature amount included in the combination whose first evaluation value is lowest (Bayes=0.08) (a feature amount that is suitable for classification into non-defective products and defective products) is the feature amount B. Accordingly, it is considered that, the feature amount B is more suitable for classification into non-defective products or defective products than the other feature amounts included in the combinations of the feature amount A and one of the other feature amounts. Thus, a value of one is added to a second evaluation value of the feature amount B.

Similarly, when the feature amount B is focused on, it is considered that, the feature amount C is more suitable for classification into non-defective products or defective products than the other feature amounts among the feature amounts included in combinations of the feature amount B and one of the other feature amounts (Bayes=0.003). Thus, the value of one is added to a second evaluation value of the feature amount C.

When a process similar to the above-described process is performed for the feature amount C, the value of one is added to the second evaluation value of the feature amount B. Finally, when the feature amount D is focused on, the first evaluation value of a combination of the feature amounts D and B and the first evaluation value of a combination of the feature amounts D and C are lowest (Bayes=0.05). In other words, regarding the feature amount D, there are two types of combinations that are most suitable for classification into non-defective products or defective products, the combination of the feature amounts D and B and the combination of the feature amounts D and C. Accordingly, a value of 0.5 is added to each of the second evaluation values of the feature amounts B and C. Furthermore, a combination of three feature amounts may be generated by selecting the feature amounts B and C in combination with the feature amount D. With the above-described process, the second evaluation values of the feature amounts A, B, C and D become 0, 2.5, 1.5, and 0, respectively. In other words, the largest the number of times a feature amount is determined as a feature amount that is most suitable for classification, the higher the second value.

Next, the concept of calculating the second evaluation values in a case of n=3 will be described with reference to FIG. 6. Basically, a process similar to the process that is performed in a case of n=2 is performed. When the feature amount A is focused on, as illustrated in FIG. 6, feature amounts included in the combinations that are most suitable for classification into non-defective products or defective products) among combinations of the feature amount A and two of the other feature amounts are the feature amount D and a feature amount F (Bayes=0.001). Accordingly, the value of one is added to a second evaluation value of the feature amount D, and the value of one is added to a second evaluation value of the feature amount F. A process similar to the above-described process is performed for all combinations of the feature amounts, thereby calculating second evaluation values of all of the feature amounts.

(Step 205: calculation of scores using function based on second evaluation value, and determination of selection criteria)

In step 205, scores to be used as criteria for selecting the feature amounts are determined using a function based on a second evaluation value (referred to as "Ln"). In this case, in the present embodiment, scores are calculated using a function such as the following equation.

$$score = Ln \qquad \text{(Equation 13)}$$

However, any function in which the score increases with the second evaluation value may be used. Note that, regarding calculation of scores, a score is determined for each of the N (the types of feature amounts that are targets to be selected) feature amounts.

(Step 206: Selection of Feature Amounts in Units of N)

In step 206, n feature amounts are selected using the feature amount whose score, which has been determined in step 205, is most favorable, i.e., whose score is highest, and the combination of feature amounts that has been evaluated in step 204 as a combination in which the feature amount is included.

Feature selection is repeated using the above-described feature selection criteria for the feature amounts excluding the selected feature amounts.

For example, in the example illustrated in FIG. 5, the second evaluation values of the feature amounts A, B, C, and D are 0, 2.5, 1.5, and 0, respectively. Accordingly, the feature amount B whose second evaluation value is highest is selected first.

Furthermore, when combinations of the feature amount B and one of the other feature amounts are generated, the feature amount C in the combination whose first evaluation value is most favorable is selected at the same time.

Next, the feature amount C whose second evaluation value is second highest is selected. However, because the feature amount C has already been selected, the next feature amount is selected. When combinations of the feature amount C and one of the other feature amounts are generated, the feature amount B in the combination whose first evaluation value is most favorable is selected. However, because the feature amount B has already been selected, the next feature amount is selected. Because the next highest second evaluation value is zero, the feature amounts are selected in ascending order of the first evaluation values, i.e., the Bayes-error-probability estimation values. When the feature amount A is focused on, the lowest first evaluation value is 0.08 that is the first evaluation value of the combination of the feature amounts A and B. Furthermore, when the feature amount D is focused on, the lowest first evaluation value is 0.05 that is each of the first evaluation value of the combination of the feature amounts D and B and the first evaluation value of the combination of the feature amounts D and C. The first evaluation value in a case in which the feature amount A is focused on is lower than the first evaluation value in a case in which the feature amount D is focused on. Accordingly, the feature amount A is selected first, and, then, the feature amount D is selected.

In this manner, finally, m, which is predetermined, feature amounts are selected in accordance with the favorable combinations.

Extraction of N features from the input patterns can be performed in an off-line state because the extraction is performed using training patterns. In an on-line process, it is only necessary to perform extraction of m feature amounts from test patterns. Accordingly, the speed of arithmetic processing can be increased. Furthermore, because m feature amounts are selected in consideration of the combinations of feature amounts, the number m of feature amounts that are finally selected can be decreased, compared with the number of feature amounts in a feature selection scheme of the related art in which only the first evaluation values are considered, and performance equivalent to that of the feature selection scheme of the related art can be maintained.

With the above-described method for calculating scores, feature amounts can be selected from a group of various feature amounts in consideration of combinations of feature amounts in an off-line state. As a result, a problem that occurs in a particular dimension can be prevented from easily occurring, and the speed of arithmetic processing can be increased.

Figure 7:
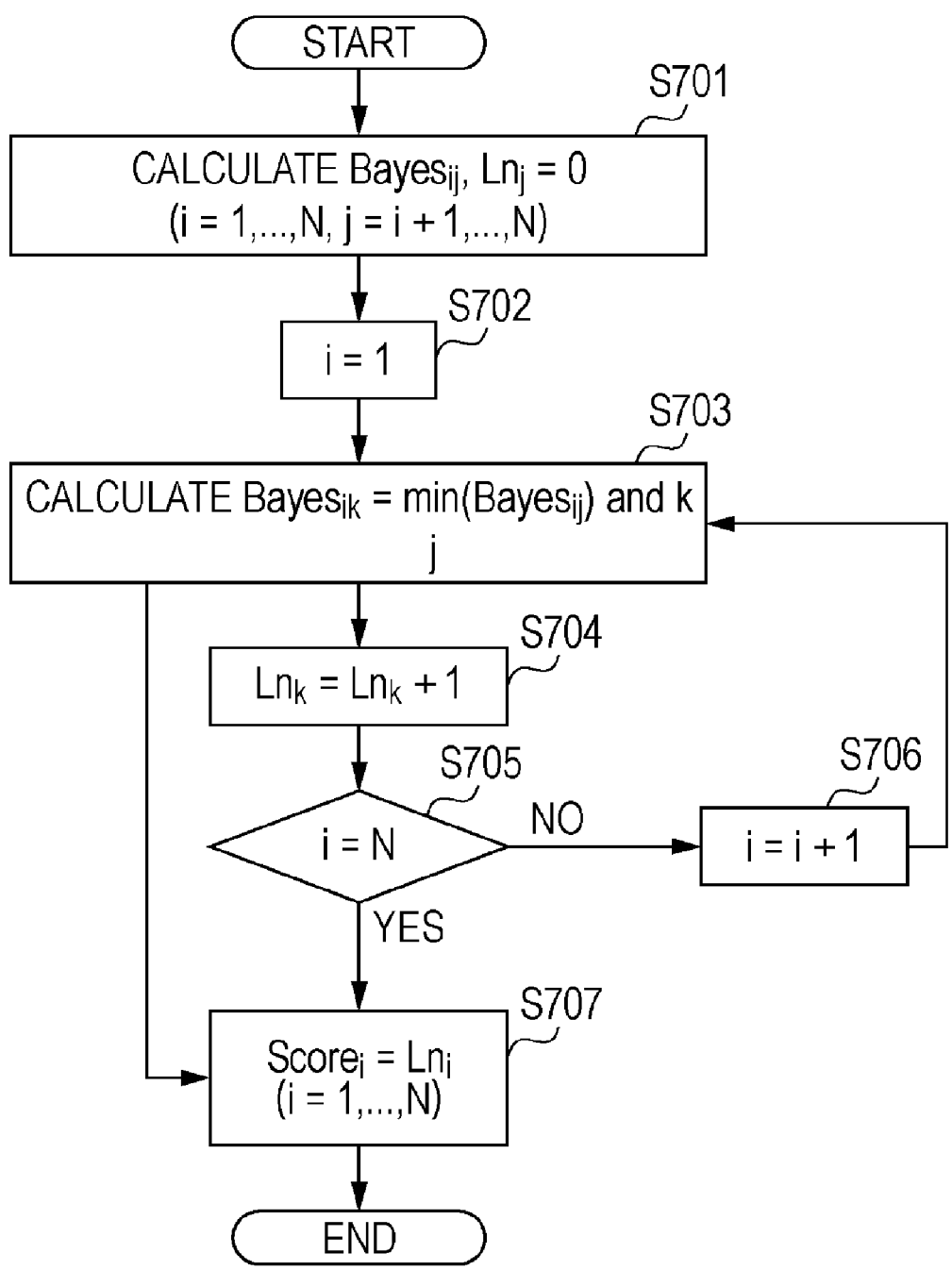
FIG. 7 is a diagram illustrating a flowchart of a process of calculating scores in the first embodiment.

Finally, a process of calculating scores in the present embodiment that has been described so far will be described. FIG. 7 is a diagram illustrating a flowchart of the process of calculating scores in the present embodiment. Regarding the process illustrated in FIG. 7, a case is described, in which feature amounts are selected in units of two from the N (the types of feature amounts that are targets to be selected) feature amounts.

(Step 701: Calculation of $Bayes_{ij}$, $Ln_i=0$ ($i=1, \ldots, N$, $j=i+1, \ldots, N$))

First, in step 701, the first evaluation values, i.e., Bayes-error-probability estimation values Bayes, of all of the combinations are determined. Feature amounts are selected from the N feature amounts in units of two. Regarding a Bayes-error-probability estimation value $Bayes_{ij}$, i denotes a first feature amount, and j denotes a second feature amount. i is changed from 1 to N, and j is changed between i+1 and N in such a manner that a feature amount which has been selected by i is not selected by j. Accordingly, $_NC_2$ combinations are generated. Furthermore, in this case, as initialization values of all of the second evaluation values, $Ln_i$ ($i=1, \ldots, N$) are set to zero.

(Step 702: Setting of Initialization Value of i)

In step 702, the first feature amount i is set to one, and the value thereof is gradually changed, thereby changing the feature amount.

(Step 703: calculation of $$Bayes_{ik} = \min_j (Bayes_{ij}) \qquad \text{[Expression 20]}$$

and k)

In step 703, the feature amount i is considered as a fixed number, and the feature amount j is considered as a variable number. The minimum value of the first evaluation value, i.e., of the Bayes-error-probability estimation value, and j in a case in which the Bayes-error-probability estimation value is the minimum are determined. j in this case is set as k. Here, the feature amounts i and k are considered as a set of two feature amounts.

(Step 704: $Ln_k=Ln_k+1$)

In step 704, one is added to the second evaluation value $Ln_k$ of the feature amount k.

(Step 705: i=N, Step S16: i=i+1)

When the value of i becomes N, the process proceeds to step 707. When the value of i is smaller than N, the process proceeds to step S706.

(Step 706: i=i+1)

In step 706, one is added to i, and the process returns to step 703.

(Step 707: $score_i = Ln_i$ (i=1, ..., N))

In step 707, the second evaluation value Ln of each of the features is determined as a score. On the basis of the scores, the feature amounts are selected in accordance with each of the sets that have been determined in step S703.

Second Embodiment

Figure 8:
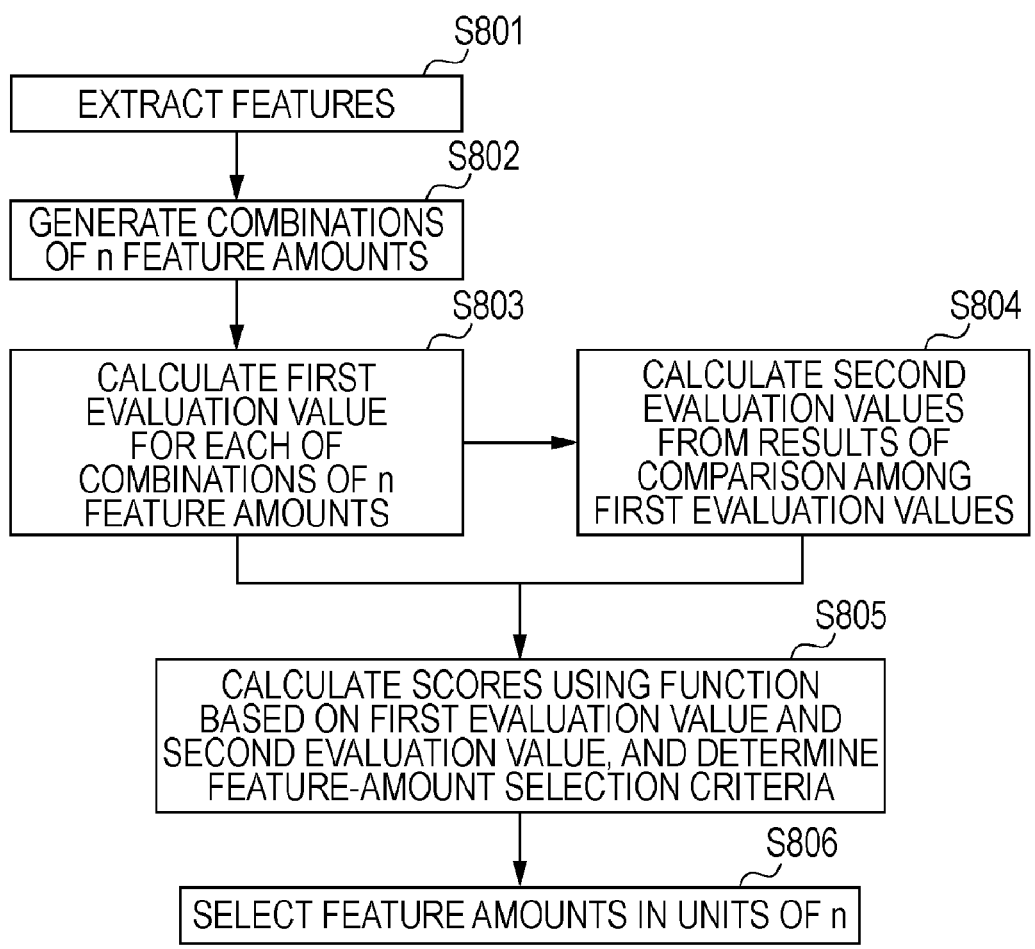
FIG. 8 is a flowchart illustrating information processing that is performed by the information processing apparatus 101 in the second embodiment.

A flow of a process in the present embodiment will be described with reference to FIG. 8. The difference between the present embodiment and the first embodiment is that step 205 illustrated in FIG. 2 in the first embodiment is changed to step 805 illustrated in FIG. 8. Accordingly, only a process in step 805, which is the difference between the present embodiment and the first embodiment, will be described. Note that, as in the first embodiment, the process in the present embodiment is performed by the information processing apparatus 101 illustrated in FIG. 1.

(Step 805: calculation of scores based on first evaluation values and second evaluation values, and determination of feature selection criteria)

In step 805, differently from the first embodiment, not only on the basis of the second evaluation values, but on the basis of both the first evaluation values and the second evaluation values, feature selection criteria are determined. Scores are determined using a function based on a first evaluation value and a second evaluation value, and feature selection criteria are determined. In this case, the scores are calculated using a function such as Equation 14 given below. However, any other function in which the score decreases with the Bayes-error-probability estimation value, and in which the score increases with the second evaluation value may be used.

[Expression 21]

$$score = \frac{Ln + b}{Bayes + a} \quad \text{(Equation 14)}$$

There is a case in which the Bayes-error-probability estimation value Bayes, which is the first evaluation value, becomes zero, and in which the second evaluation value Ln becomes zero. Accordingly, a and b that are values which are not zero are added in Equation 14. For example, if 1000 feature amounts exist, the minimum of the first evaluation value Bayes for each of the feature amounts is zero, and the maximum is one. Furthermore, the minimum of the second evaluation value Ln is zero, and the maximum is 1000. In this case, an appropriate value of a is approximately 1, and an appropriate value of b is approximately 0.001.

With the function for calculating a score in the present embodiment, feature selection can be performed in consideration of evaluations of feature amounts and evaluations of combinations of the feature amounts. Accordingly, only necessary feature amounts can be selected. A problem that occurs in a particular dimension can be prevented from easily occurring, and the speed of arithmetic processing can be increased.

Figure 9:
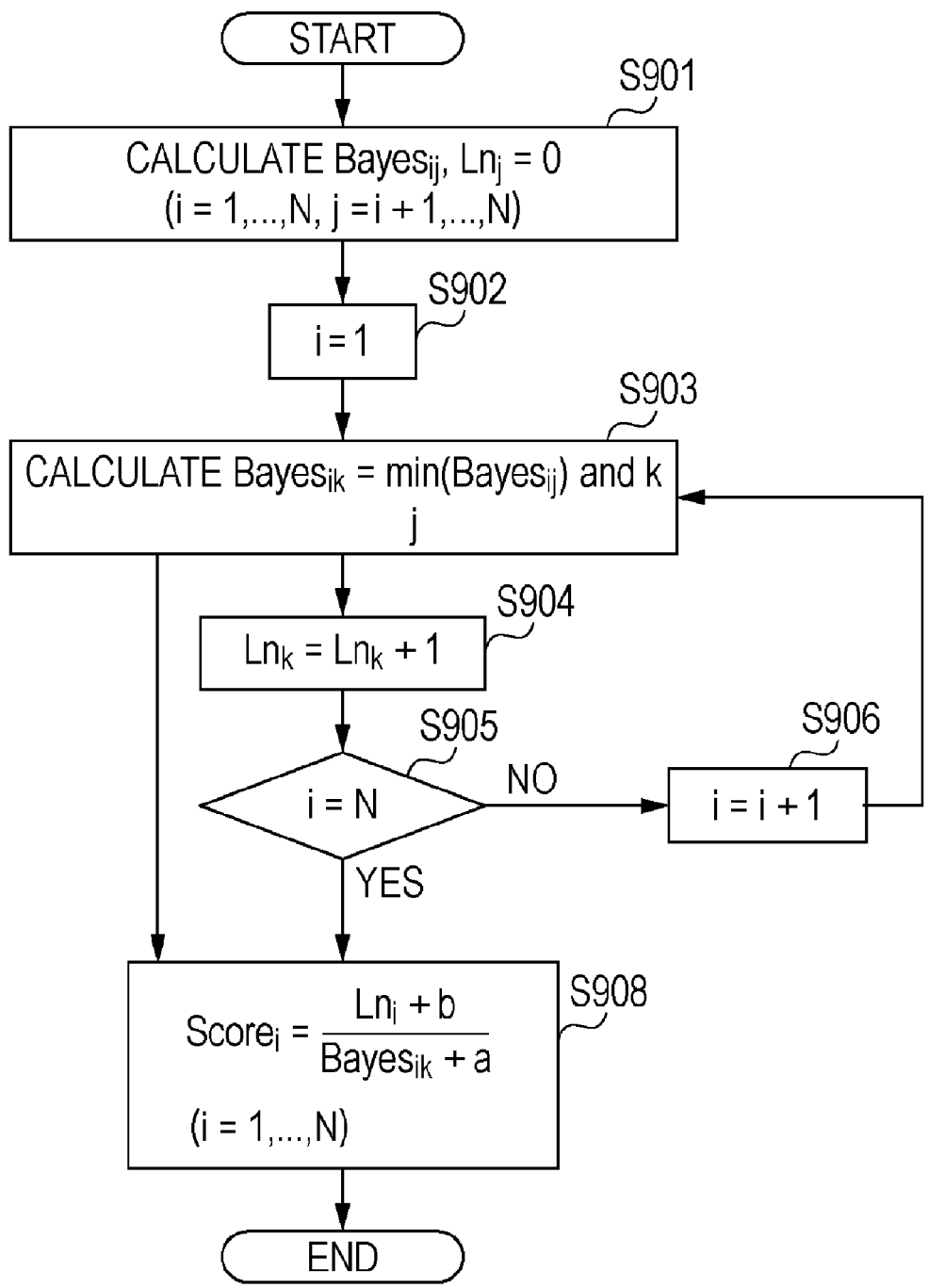
FIG. 9 is a diagram illustrating a flowchart of a process of calculating scores in the second embodiment.

Finally, an algorithm for calculating a score in the present embodiment that has been described so far is illustrated in FIG. 9. As in the case illustrated in FIG. 7, FIG. 9 illustrates a case in which feature amounts are selected in units of two from the N feature amounts. Step 908 that is the difference between a flowchart illustrated in FIG. 9 and the flowchart illustrated in FIG. 7 is as follows.

(Step 908:

$$score_i = \frac{Ln_i + b}{Bayes_{ik} + a} \quad (i = 1, ..., N)) \quad \text{[Expression 22]}$$

Scores are calculated using a function using the first evaluation value Bayes, which has been calculated in step 903, and the second evaluation value Ln. As in the first embodiment, the feature amounts are selected for each of sets of the feature amounts that have been determined in step 903.

Third Embodiment

Figure 10:
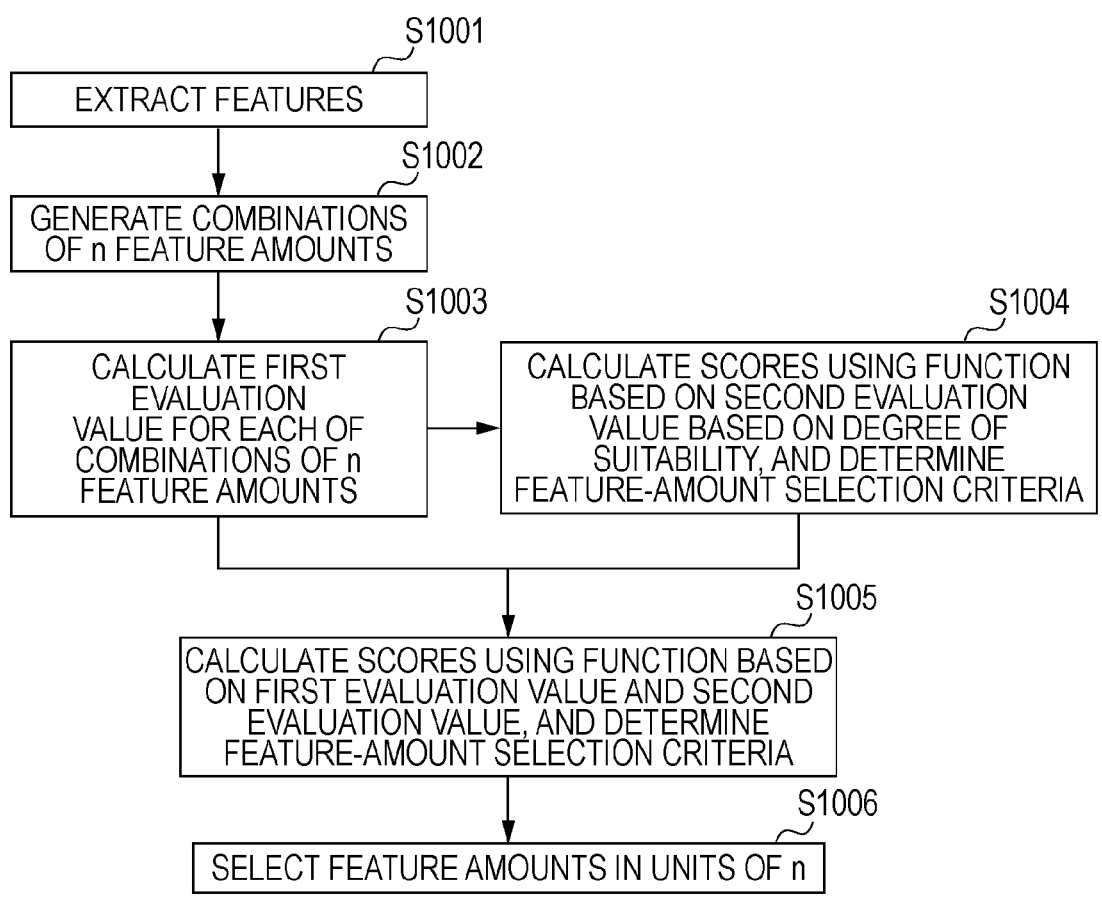
FIG. 10 is a flowchart illustrating information processing that is performed by the information processing apparatus 101 in a third embodiment.

A process in the present embodiment will be described with reference to a flowchart illustrated in FIG. 10. The difference between the present embodiment and the second embodiment is that step 804 illustrated in FIG. 8 in the second embodiment is changed to step 1004. Accordingly, only step 1004, which is the difference between the present embodiment and the second embodiment, will be described. Furthermore, although a scheme in the third embodiment can be applied to the first embodiment, here, a description thereof is omitted. Note that, as in the second embodiment, the process in the present embodiment is performed by the information processing apparatus 101 illustrated in FIG. 1.

(Step 1004)

In the present embodiment, a degree of suitability for an evaluation criterion that is set in advance is determined for each of the plurality of first evaluation values. Then, a predetermined value is added more times to the second evaluation value of each feature amount constituting the combination whose first evaluation value corresponds to a higher degree of suitability, thereby calculating the second evaluation values.

In the present embodiment, as in the first and second embodiments, the first evaluation values (here, the Bayes-error-probability estimation values) are determined for all of the combinations of feature amounts.

For example, as in the case illustrated in FIG. 5 in the first embodiment, in a case in which the feature amounts A, B, C, and D exist, combinations of feature amounts are generated by selecting at least two feature amounts at the same time. For each of the feature amounts A to D, the value of one is added to the second evaluation value of the feature amount included in the combination whose first evaluation value is most favorable. When the feature amount A is focused on, a feature amount included in the combination whose first evaluation value is most favorable, i.e., whose Bayes-error-probability estimation value is the lowest (Bayes=0.08), among the combinations of the feature amount A and one of the other feature amounts is the feature amount B. Thus, the value of one is added to the second evaluation value of the feature amount B. As in the first and second embodiments, the above-described process is performed for all of the feature amounts.

Figure 11:
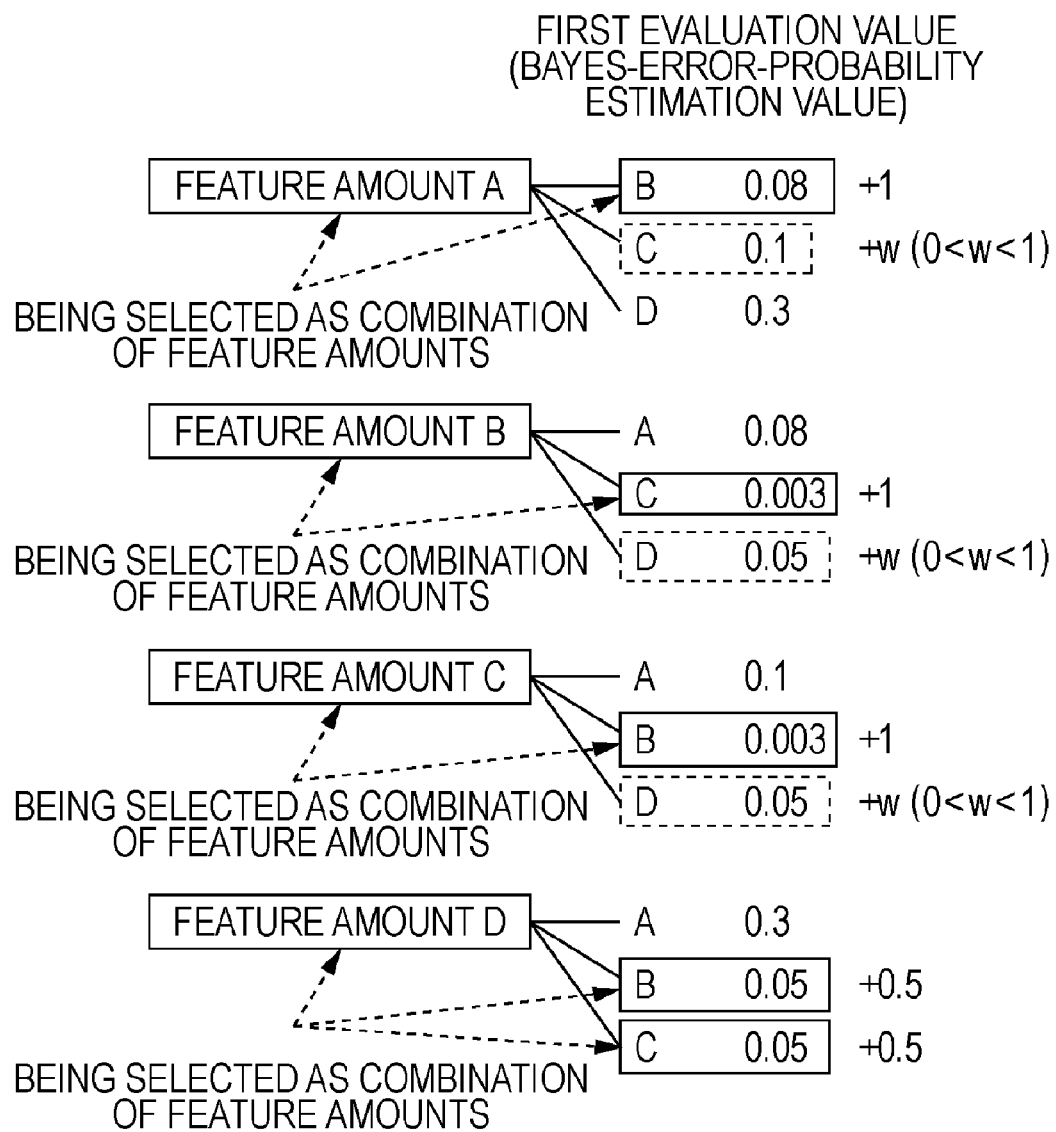
FIG. 11 is a diagram illustrating an overview of a process of calculating the second evaluation values in the third embodiment.

In the present embodiment, differently from the first and second embodiments, for each of the feature amounts A to D, a value of w (0<w<1) is added to the second evaluation value of the feature amount included in the combination whose first evaluation value is second most favorable. When the feature amount A is focused on, a feature amount included in the combination whose first evaluation value for the feature amount A is second most favorable, i.e., whose Bayes-error-probability estimation value is second lowest (Bayes=0.1), among the combinations in which the feature amount A is included is the feature amount C. Thus, the value of w is added to the second evaluation value of the feature amount C. As the first evaluation value becomes more unfavorable, a smaller value may be added to the second evaluation value. In FIG. 11, the value is added to the second evaluation value of the feature amount that is second most favorable. Next, when the feature amount B is focused on, a feature amount included in the combination whose first evaluation value for the feature amount B is second most favorable, i.e., whose Bayes-error-probability estimation value is second lowest (Bayes=0.05), among the combinations in which the feature amount B is included is the feature amount D. Thus, the value of w is added to the second evaluation value of the feature amount D. Furthermore, when the feature amount C is focused on, a feature amount included in the combination whose first evaluation value for the feature amount C is second most favorable, i.e., whose Bayes-error-probability estimation value is second lowest (Bayes=0.05), among the combinations in which the feature amount C is included is the feature amount D. Thus, the value of w is added to the second evaluation value of the feature amount D. Note that, when the feature amount D is focused on, regarding a feature amount whose first evaluation value is most favorable, i.e., whose Bayes-error-probability estimation value is lowest (Bayes=0.05), among the combinations in the feature amount D is included, there are two feature amounts, the feature amounts B and C. Thus, the predetermined value is not added to the second evaluation value of the feature amount in included in the combination whose first evaluation value is second most favorable. Consequently, when the second evaluation values to which the predetermined value has been added are calculated as sums, the second evaluation values of the feature amounts A, B, C and D are 0, 2.5, 1.5+w, and 2w, respectively. In this manner, more accurate second evaluation values can be calculated.

As described above, more accurate evaluation values can be calculated using the method for calculating second evaluation values in the present embodiment, and features having a better compatibility within a combination can be selected. Only necessary feature amounts can be selected. As a result, a problem that occurs in a particular dimension can be prevented from easily occurring, and the speed of arithmetic processing can be increased.

Fourth Embodiment

In the above-described embodiments, for a two-class issue in which the values of the patterns belonging to the classes $w_1$ and $w_2$ are known, the evaluation values with which the classes $w_1$ and $w_2$ can be separated from each other are selected.

However, in reality, a case is considered, in which only the values of the patterns belonging to the class $w_1$ are known, and in which the values of the patterns belonging to the class $w_2$ are unknown. An example of the case includes a case in which, in inspection for non-defective products, the values of patterns belonging to defective products are unknown, and in which only the values of patterns belonging to non-defective products are known. For this reason, in the present embodiment, a process using evaluation values indicating degrees of separation that can be calculated using only the patterns belonging to the class $w_1$ is performed.

Hereinafter, evaluation values that can be calculated using only the patterns belonging to the class $w_1$ will be described.

The distribution density of the class $w_1$ can be considered as an evaluation value indicating a degree of separation of the class $w_1$ from the class $w_2$. Supposing that the distribution density of the class $w_1$ is high, a range in which the distribution of the class $w_1$ diverges in a feature space becomes narrow, so that a probability that the distribution of the class $w_1$ and the distribution of the class $w_2$ overlap each other becomes low. In contrast, the range in which the distribution of the class $w_1$ diverges in the feature space becomes wide, so that the probability that the distribution of the class $w_1$ and the distribution of the class $w_2$ overlap each other becomes high. As described above, the number of patterns that overlap one another changes in accordance with the distribution density of $w_1$.

However, even in a case in which the distribution density of the class $w_1$ is high, when there are overlaps, a large number of patterns in the distribution overlap one another because the distribution density of the class $w_1$ is high. Furthermore, even in a case in which the distribution density of the class $w_1$ is low, if there are overlaps, the number of patterns that overlap one another is small because the distribution density of the class $w_1$ is low.

However, typically, the higher the distribution density of $w_1$, the smaller the number of patterns that overlap one another between the classes $w_1$ and $w_2$. Accordingly, feature amounts with which the distribution density of the class $w_1$ becomes higher are better to be used as feature amounts for separating the classes $w_1$ and $w_2$ from each other.

In the present embodiment, a Euclidean distance between a centroid of the patterns belonging to the class $w_1$ and the pattern that is farthest from the centroid is used as an evaluation value indicating the distribution of the patterns belonging to the class $w_1$. Furthermore, a standard deviation of Euclidean distances between the centroid and all of the patterns can be used as an evaluation value. Alternatively, concepts of other distances including a Manhattan distance and so forth may be used.

Hereinafter, a flow of a process in the present embodiment will be described.

Figure 12:
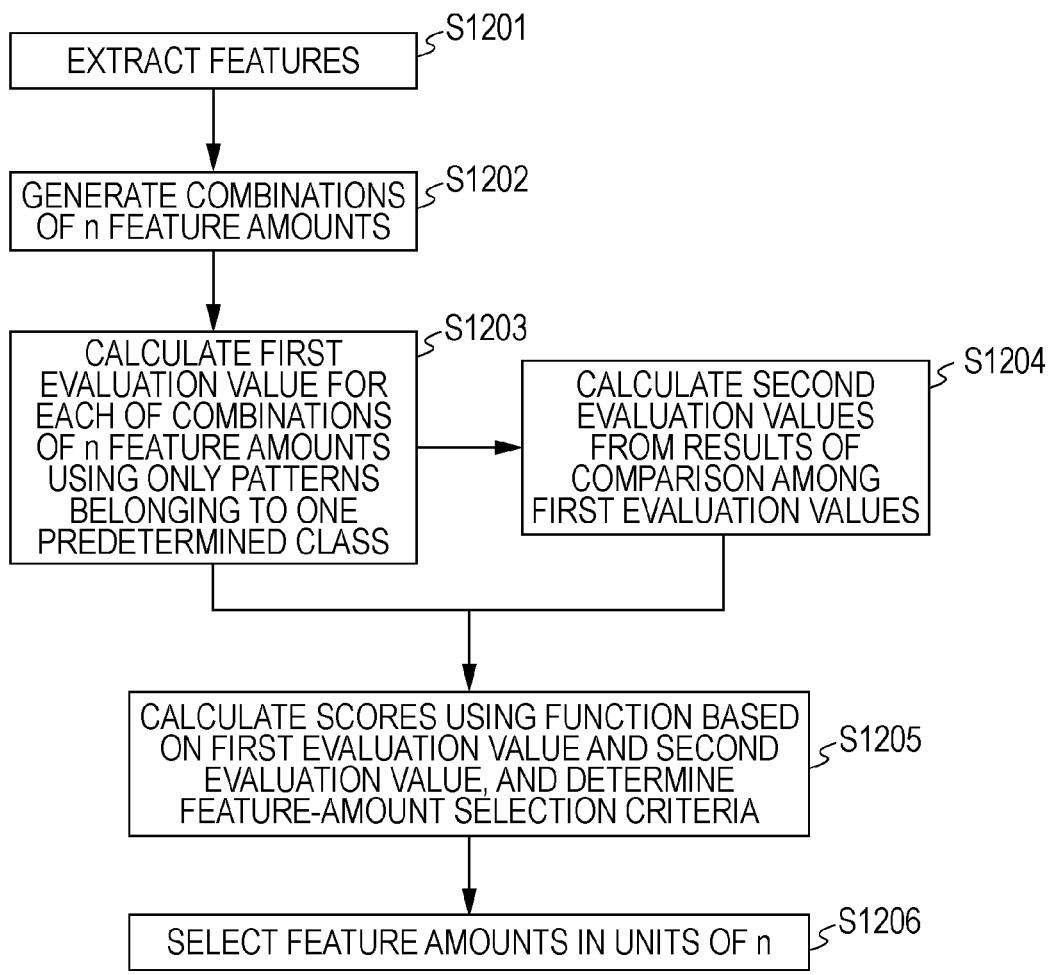
FIG. 12 is a diagram illustrating a flow of a process in a fourth embodiment.

FIG. 12 is a diagram illustrating the flow of the process in the present embodiment. The difference between the present embodiment and the second embodiment is that step 803 illustrated in FIG. 8 in the second embodiment is changed to step 1203. Accordingly, only step 1203, which is the difference between the present embodiment and the second embodiment, will be described. Note that, as in the second embodiment, the process in the present embodiment is performed by the information processing apparatus 101 illustrated in FIG. 1.

Figure 13:
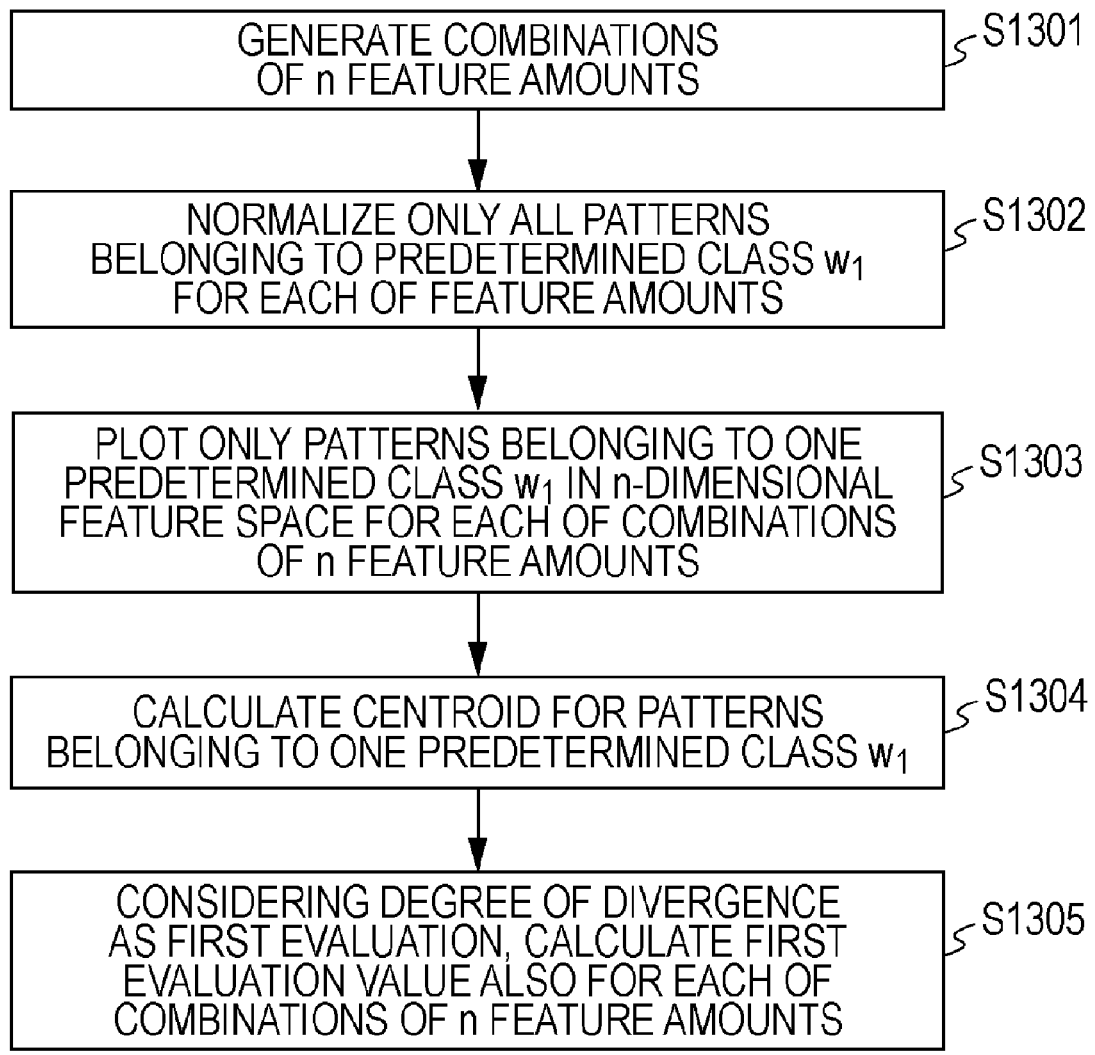
FIG. 13 is a diagram illustrating the details of a process in step 1203 in the fourth embodiment.

FIG. 13 is a diagram illustrating the details of a process in step 1203 in the present embodiment. Hereinafter, the details of the process in step 1203 will be described with reference to FIG. 13. Note that, because step 1301 corresponds to step 1202, a description thereof is omitted.

(Step 1302: normalization of only all of patterns belonging to predetermined class $w_1$ for each of feature amounts)

In step 1302, all of the patterns belonging to the class $w_1$ are normalized for each of the feature amounts using a standard deviation of the feature amount. The reason for this is that, in the present embodiment, it is necessary to evaluate the feature amounts using Euclidean distances in an n-dimensional feature space.

(Step 1303: plotting of only patterns belonging to one predetermined class $w_1$ for each of combinations of n feature amounts in n-dimensional feature space)

Next, in step 1303, the patterns belonging to the one class $w_1$ are plotted in the n-dimensional feature space for each of the combinations of n feature amounts that have been generated.

Figure 14:
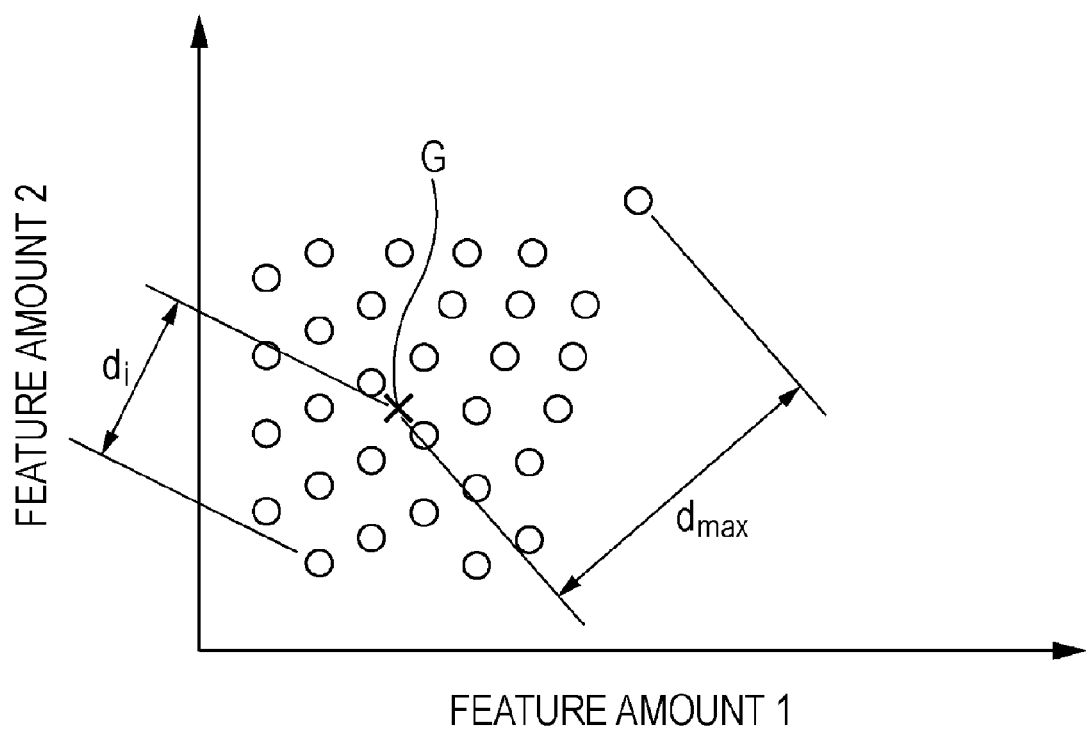
FIG. 14 is a diagram illustrating a feature space in which patterns belonging to one class $w_1$ are plotted.

FIG. 14 is a diagram illustrating the feature space in which the patterns belonging to the one class $w_1$ are plotted in a case of n=2.

(Step 1304: calculation of centroid of patterns belonging to one predetermined class $w_1$)

In step 1304, a centroid G of the patterns that have been plotted in the feature space is calculated.

(Step 1305: considering degree of divergence as first evaluation value, calculation of first evaluation value also for each of combinations of n feature amounts)

In step 1305, in the n-dimensional feature space, a Euclidean distance $d_{max}$ between the centroid G, which has been determined in step 1304, and the pattern that is farthest from the centroid G is determined. The Euclidean distance is considered as a degree of divergence. Alternatively, regarding Euclidean distances $d_i$ between the centroid G and the individual patterns, a standard deviation of $d_i$ between the centroid G and all of the patterns is considered as a degree of divergence. The degree of divergence that has been calculated using the above-described process is considered as the first evaluation value as in the above-described embodiments.

Note that, as in the case of the Bayes-error-probability estimation value, a lower degree of divergence indicates that it is better to be used as a feature amount for separating classes. Accordingly, the Euclidean distance in the n-dimensional feature space can be considered as the degree of divergence, and the degree of divergence can be used as the first evaluation value as in the case of the Bayes-error-probability estimation value. According to the present embodiment, feature amounts can be selected using only data items concerning one class.

Note that, although a one-class issue is described in the above description, the present embodiment can also be applied to a multiple-class issue. In order to express a degree of separation of a certain class from another class, a Euclidean distance between a centroid and a pattern that is farthest from the centroid in the n-dimensional feature space can be utilized as the degree of divergence.

(Other Embodiments)

In the above-described embodiments, utilization in appearance inspection is described. However, the present invention can also be used for a case in which feature amounts to be used in face recognition or in an issue of classification of patterns, such as multimodal multi-dimensional data items including moving images, are selected from various feature amounts. Note that the present invention can also be used in other pattern recognition or in a field of data mining.

Furthermore, in the above-described embodiments, each of the feature amounts is evaluated using the Bayes-error-probability estimation value, and the feature amounts are selected. A scheme in which feature amounts are evaluated in advance before a classifier performs classification using the feature amounts is called a filter scheme. On the other hand, a scheme in which a classifier that classifies non-defective products, defective products, and so forth performs classification using feature amounts in reality to evaluate the performance of the classifier, and in which whether or not the feature amounts are to be used is determined is called a wrapper scheme. Because classification results are considered in the wrapper scheme, the performance of the wrapper scheme is higher than that of the filter scheme. However, the wrapper scheme has a disadvantage that an enormous amount of calculation time is necessary. For this reason, in order to effectively perform the wrapper scheme for an enormous number of feature amounts, a scheme has been proposed, in which feature amounts are narrowed down using the filter scheme in which calculation can be performed at a high speed. The calculation time can be reduced by narrowing down feature amounts, compared with the calculation time in a case in which only the wrapper scheme is used. The schemes in the above-described embodiments can be performed in combination with the wrapper scheme that is used as second selection means.

Moreover, the processes in the above-described embodiments can be realized by processing, with a computer, a computer program that is recorded in a recording medium such as a CD-ROM.

INDUSTRIAL APPLICABILITY

The present invention can be applied to an information processing apparatus that performs appearance inspection on industrial products.

REFERENCE NUMERALS

101 information processing apparatus
102 inspection target object
103 image pickup apparatus

The invention claimed is:

1. An information processing apparatus for selecting, from a plurality of feature amounts that are extracted from input data items, feature amounts that are to be used to classify the input data items, the information processing apparatus comprising:
   generating means for generating a plurality of combinations by generating combinations of feature amounts that are selected from the plurality of feature amounts;
   first calculating means for calculating, for each of the plurality of combinations, a first evaluation value for evaluating a suitability for classification of the input data items; and
   second calculating means for obtaining, on the basis of the first evaluation values, for each of the plurality of feature amounts, a second evaluation value for evaluating a suitability for classification of the input data items.

2. The information processing apparatus according to claim 1, further comprising selection means for selecting, on the basis of the second evaluation values, from the plurality of feature amounts, feature amounts that are to be used to classify the input data items.

3. The information processing apparatus according to claim 1, further comprising setting means for setting, on the basis of the second evaluation values, selection criteria for selecting feature amounts that are to be used to classify the input data items from the plurality of feature amounts.

4. The information processing apparatus according to claim 1,
   wherein the input data items are input image data items of picked-up images of inspection target objects that are appearance inspection targets, and
   wherein the first evaluation values and the second evaluation values are evaluation values for evaluating whether or not the inspection target objects are non-defective products.

5. The information processing apparatus according to claim 2, wherein the first evaluation values are evaluation values for evaluating degrees of separation for classification of the input data items.

6. The information processing apparatus according to claim 5, wherein the first evaluation values are Bayes-error-probability estimation values for classification of the input data items.

7. The information processing apparatus according to claim 1,
   wherein the second calculating means calculates,
   by comparing the first evaluation values with one another, each of the first evaluation value being calculated for a corresponding one of the plurality of combinations, the second evaluation values, each of the second evaluation values being used to evaluate a suitability of a corresponding one of the plurality of feature amounts for classification of the input data items.

8. The information processing apparatus according to claim 5, wherein the first evaluation values are ratios of within-class variances to between-class variances for classification of the input data items.

9. The information processing apparatus according to claim 1, wherein the second calculating means extracts, on the basis of the first evaluation values, for each of the combinations, a feature amount that is suitable for classification of the input data items, and calculates each of the second evaluation values for a corresponding one of the plurality of feature amounts on the basis of a number of times the feature amount has been extracted.

10. The information processing apparatus according to claim 3, wherein the setting means sets the selection criteria on the basis of the first evaluation values and the second evaluation values.

11. The information processing apparatus according to claim 1, wherein the second calculating means determines a degree of suitability of each of the first evaluation values for an evaluation criterion that is set in advance, and calculates the second evaluation values on the basis of results of determination of the degrees of suitability.

* * * * *

UNITED STATES PATENT AND TRADEMARK OFFICE
Certificate

Patent No. 8,189,906 B2　　　　　　　　　　　　　　　　　　　　　Patented: May 29, 2012

On petition requesting issuance of a certificate for correction of inventorship pursuant to 35 U.S.C. 256, it has been found that the above identified patent, through error and without any deceptive intent, improperly sets forth the inventorship.
　Accordingly, it is hereby certified that the correct inventorship of this patent is: Tomotaka Fujimori, Yokohama (JP); Masakazu Matsugu, Yokohama (JP); Yusuke Mitarai, Tokyo (JP); and Masafumi Takimoto, Kawasaki (JP).

Signed and Sealed this Twelfth Day of November 2013.

STEPHEN R. KOZIOL
*Supervisory Patent Examiner*
Art Unit 2665
Technology Center 2600